(12) United States Patent
Matsuba

(10) Patent No.: US 7,902,492 B2
(45) Date of Patent: Mar. 8, 2011

(54) MEASURING UNIT FOR AIR FLOW

(75) Inventor: Katsumi Matsuba, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 198 days.

(21) Appl. No.: 12/414,881

(22) Filed: Mar. 31, 2009

(65) Prior Publication Data

US 2009/0241684 A1    Oct. 1, 2009

(30) Foreign Application Priority Data

Apr. 1, 2008    (JP) .................................. 2008-094989

(51) Int. Cl.
*H01J 3/14*    (2006.01)

(52) U.S. Cl. ....................................... 250/216

(58) Field of Classification Search .................. 250/216, 250/234, 239; 73/861; 414/270, 274; 454/187
See application file for complete search history.

(56) References Cited

FOREIGN PATENT DOCUMENTS

| | | |
|---|---|---|
| JP | 05-099945 A | 4/1993 |
| JP | 08-114526 A | 5/1996 |
| JP | 2007-297196 A | 11/2007 |

*Primary Examiner* — Georgia Y Epps
*Assistant Examiner* — Don Williams
(74) *Attorney, Agent, or Firm* — Keating & Bennett, LLP

(57) ABSTRACT

A casing is capable of being transported by a transportation apparatus in an automated warehouse and being placed in a cell of the automated warehouse. A plurality of strings are suspended in the casing, and displacement of the strings caused by the air flow in the casing is measured to determine the state of the air flow based on the measured displacement.

4 Claims, 4 Drawing Sheets

F I G. 1
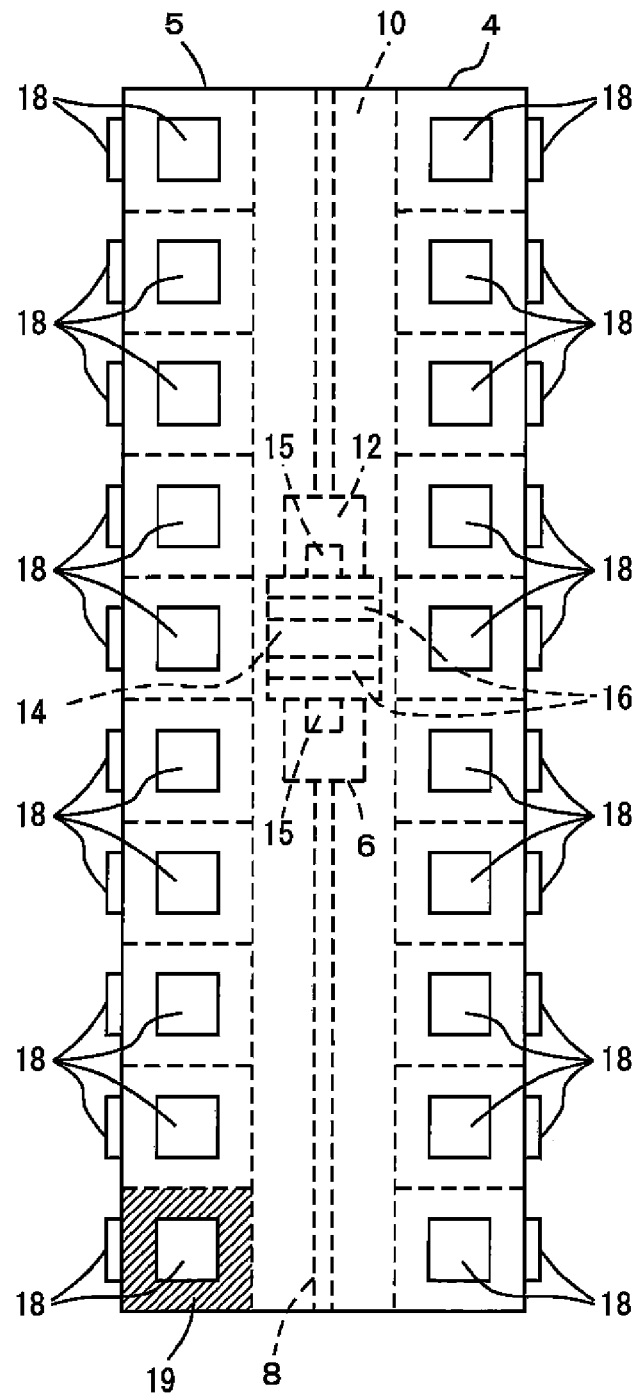

MEASURING UNIT FOR AIR FLOW

BACKGROUND OF THE INVENTION

1. Field of the Invention

The present invention relates to a measuring unit used for measuring air flow in an automated warehouse.

2. Description of the Related Art

A technique of providing a unit equipped with a measuring device for measuring cleanness, and placing the unit in cells of an automated warehouse using a transportation apparatus in the warehouse to measure an environment in the cells is known (see JP 2007-297196A, for example). In JP 2007-297196A, an evaporator mist generator and a slit like laser light source are provided for imaging a light reflected by mist to measure air flow. Further, particle counters measures the number of contaminated articles or the like. In this manner, the environment in each cell and an ambient environment of articles during transportation can be measured. However, the combination of a mist source, a laser light source, and a camera requires a large scale system.

SUMMARY OF THE INVENTION

Preferred embodiments of the present invention provide an arrangement that measures air flow in an automated warehouse easily.

A preferred embodiment of the present invention relates to a measuring unit arranged to measure air flow, and the measuring unit has a casing capable of being transported by a transportation apparatus in an automated warehouse and being placed in a cell of the automated warehouse. The measuring unit preferably includes: a plurality of strings suspended in the casing; a measuring device arranged to measure displacement of the strings caused by air flow in the casing; and a computation device arranged to determine a state of the air flow based on the measured displacement of the strings.

Further, a preferred embodiment of the present invention relates to a method of measuring air flow in an automated warehouse. The method includes the steps of: providing a measuring unit in the automated warehouse, the measuring unit having a plurality of strings in a casing arranged to be transported by a transportation apparatus in the automated warehouse and to be placed in a cell of the automated warehouse; measuring a displacement of the strings caused by air flow in the casing; and determining a state of the air flow based on the measured displacement of the strings.

Preferably, the casing is divided into at least upper and lower layers, and the strings and the measuring device are provided in each of the layers to allow the computation device to determine the state of the air flow in each of the layers.

Further, the measuring device preferably includes a camera arranged to image the strings from an upper position or from a lower position.

Since air flow is measured based on displacement of the strings suspended in the casing, no mist generator or laser light source is required. Therefore, measurement of the air flow in the casing is simplified.

In the case where the casing is divided into at least upper and lower layers, and the strings and the measuring device are provided in each layer to allow the computing device to determine the state of the air flow in each layer, the state of the air flow in each layer of the casing can be independently measured.

In general, the air flow in the automated warehouse is not strong. Therefore, even if the strings are displaced due to the air flow, the positional relationship in the arrangement of the strings is not undesirably changed. Thus, by imaging the strings from an upper position or from a lower position using a camera, the individual strings can be identified. Further, it is possible to easily detect how the strings have been displaced from positions where no air flow is present.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIG. 1 is a plan view showing an automated warehouse according to a preferred embodiment of the present invention.

DETAILED DESCRIPTION OF PREFERRED EMBODIMENTS

Figure 2:
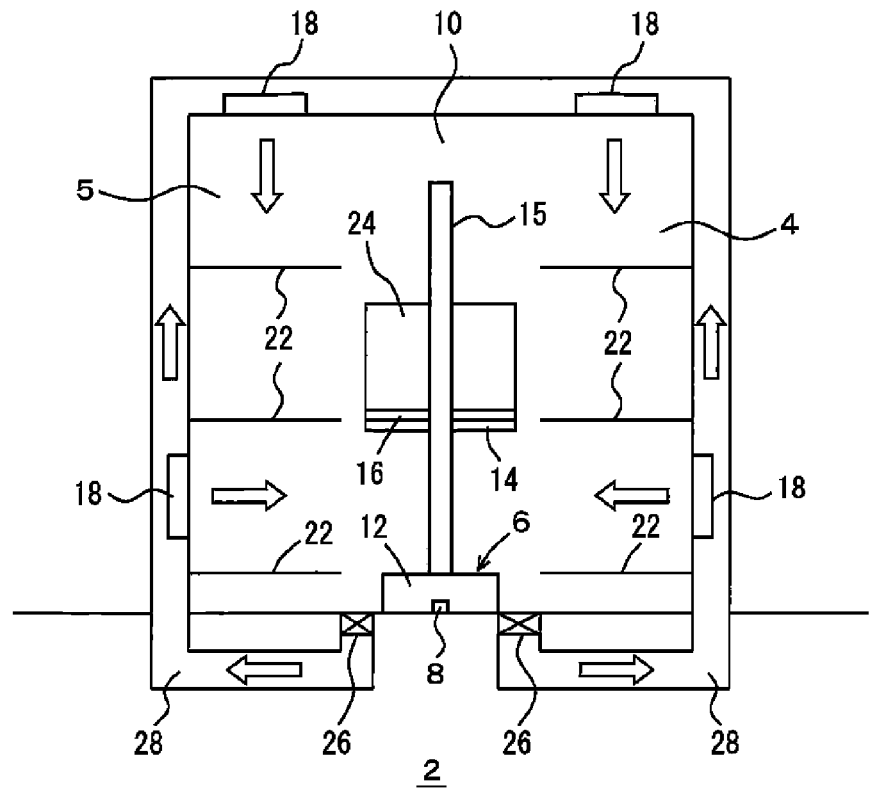
FIG. 2 is a front view showing a preferred embodiment of the present invention.

FIGS. 1 to 7 show preferred embodiments of the present invention. A reference numeral 2 denotes an automated warehouse provided in a clean room. Reference numerals 4 and 5 denote racks. A reference numeral 6 denotes a stacker crane as a transportation apparatus in the warehouse. For example, other transportation apparatuses such as a conveyor may be used. A reference numeral 8 denotes a travel rail of the stacker crane 6. A reference numeral 10 denotes a traveling space of the stacker crane 6. The racks may also be provided on only one side of the traveling space 10 if desirable. Further, some of the racks 4, 5 may be replaced with semiconductors or processing equipment such as a flat panel display, for example.

As shown, e.g., in FIG. 2, the stacker crane 6 has a carriage 12 and an elevation frame 14 that is elevated along a mast 15. The elevation frame 14 has a transfer apparatus 16 such as a slide fork or a SCARA arm, for example. Further, for example, a turntable arranged to rotate the transfer apparatus 16 together with articles may be provided between the elevation frame 14 and the transfer apparatus 16. Fan filter units (FFUs) 18 may be provided at the ceiling of the automated warehouse 2 and on sides of the automated warehouse 2, e.g., on the back surface side of cells in the lowest stage for supplying clean air. In FIG. 1, although the FFUs 18 are provided at the same pitch as the cells 22, the actual layout of the FFUs 18 can be arbitrarily determined. Further, the FFUs 18 are provided on the back surface side of the cells 22 in the lowest stage because flow of the clean air from the FFUs 18 at the ceiling does not arrive at positions below the racks 4, 5 easily, and entry of wind generated by running of the stacker crane 6 needs to be prevented.

A charging station 19 is preferably provided at one position of the racks 4, 5 so that a measuring unit 24 can be charged by the charging station 19. Further, the charging station 19 may have a communication interface arranged to communicate with the measuring unit 24 to acquire data from the measuring unit 24. A reference numeral 20 denotes a ground controller arranged to control the FFUs 18 and openings of exhaust valves described later, and the stacker crane 6. Reference numerals 22 denote the cells arranged to store e.g., semiconductor cassettes or cassettes for flat panel displays or the like, for example. The types of the stored articles can be determined arbitrarily. In this preferred embodiment, it is assumed that cassettes for flat panel displays are stored, and each of the cassettes has upper and lower stages of cells arranged to support glass plates, and has a skeleton shape having an opening on the front side for allowing the transfer apparatus to move into, and move out of the opening. Reference numerals 26 denote exhaust valves provided adjacent to a floor of the automated warehouse 2. Each of the exhaust valves 26 preferably has an adjustable opening. Reference numerals 28 denote return channels arranged to supply air circulating from the exhaust valves 26 to the FFUs 18.

Figure 3:
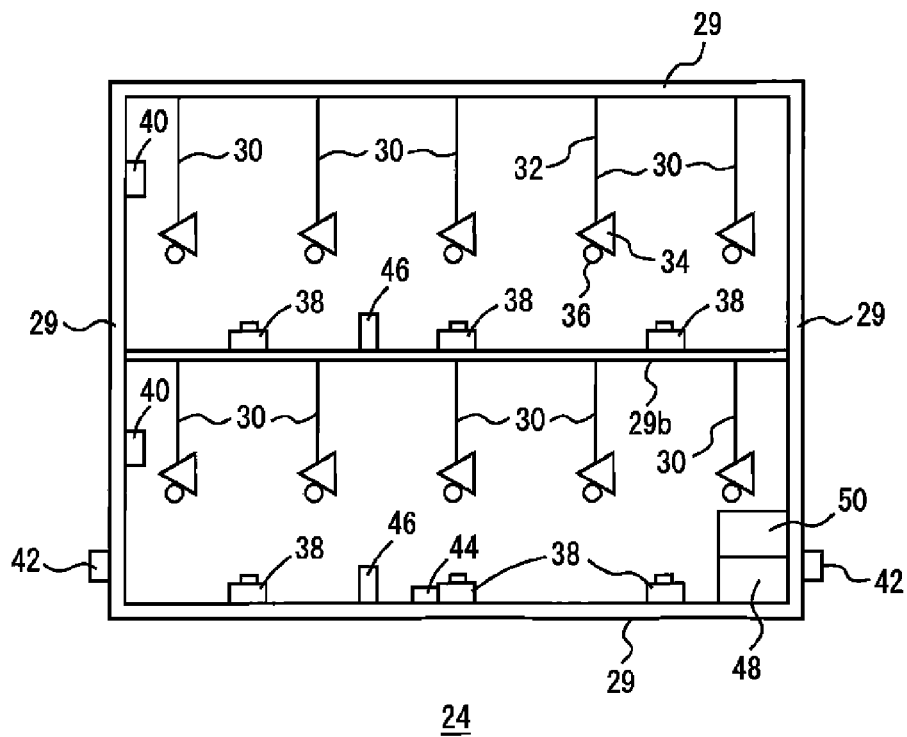
FIG. 3 is a side view showing a measuring unit used in a preferred embodiment of the present invention.

FIG. 3 shows structure of the measuring unit 24. Reference numeral 29 denotes skeleton frames of a casing. The measuring unit 24 is preferably partitioned into upper and lower two stages by an opaque partition 29b, for example. The partition 29b dividing the measuring unit 24 into upper and lower stages may or may not be provided. Alternatively, the measuring unit 24 may be partitioned into three or more stages. By the partition, a change in the air flow at each height position can be detected, and by limiting the air flow in the height direction, the air flow can be rectified horizontally. In each of upper and lower stages of the measuring unit 24, tracers 30 are suspended from upper positions. For example, the tracers 30 are preferably arranged in a matrix pattern. Each of the tracers 30 is preferably made up of a string 32 and a windsail 34 provided at a lower end of the string 32, and a reflector 36. The string is not limited to a twisted yarn, but could also be a single fiber or any other desirable string type, for example. Material and shape of the string may be adopted arbitrarily as long as the string has a lightweight, and it is curved flexibly and does not have anisotropy in the width direction, such as a tape. Preferably, the reflector 36 is a spherical body having a lightweight such as a foamed styrene sphere and has a reflection film provided by evaporation or the like.

Figure 4:
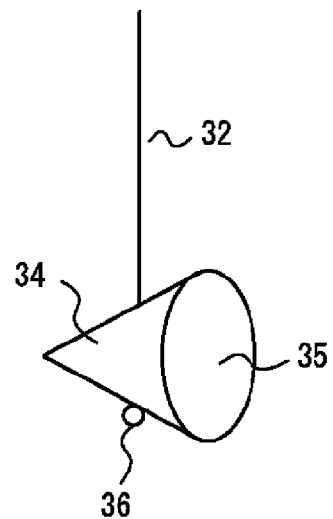
FIG. 4 is a side view showing a tracer in a preferred embodiment of the present invention.

In FIG. 4, the windsail 34 is made of a paper, fabric, plastic or the like, for example. The windsail 34 has a conical shape having an opening 35. For example, the opening 35 is provided in a surface on the upstream side. When the air flow of the clean air is applied to the windsail 34, the windsail 34 moves together with the reflector 36. When weak air flow in the cell and on the elevation frame is applied to the tracer 30, the tracer 30 is displaced significantly so that the orientation and the wind speed can be determined accurately. The shape of the windsail 34 is not limited to the conical shape. For example, the windsail 34 preferably has a cylindrical shape, and the string 32 may extend to a position below the windsail 34 or the reflector 36. Instead of providing the reflector 36, the position of the windsail 34 itself may be imaged. The position of the windsail 34 may be measured by other devices such as a supersonic sensor.

Figure 5:
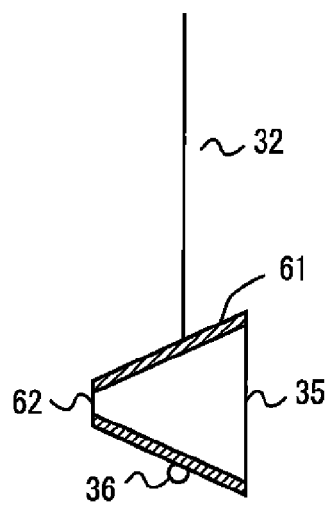
FIG. 5 is a sectional view showing a tracer in a vertical direction in a preferred embodiment of the present invention.

In FIG. 5, a reference numeral 60 denotes a tracer according to a modified preferred embodiment. The tracer 60 has a windsail 61 having an opening 62 at its front end. The tracer 60 has the same structure as the tracer 30 in other respects. The shape of the windsail 60 is not limited to the conical shape, and the windsail 60 may have a cylindrical shape, for example. However, the conical windsails 34, 61 are advantageous in receiving weak air flow in the automated warehouse.

Further, the string 32 may be extended to a position below the windsails 34, 61 or the reflector 36.

Referring back to FIG. 3, reference numerals 38 denote strobe cameras. In general, a strobe light is provided because space in the automated warehouse 2 is dark. The strobe light may be provided separately from the camera 38. For example, the strobe camera 38 is used for imaging the reflector 36 upwardly from a lower position, or downwardly from an upper position. By adjusting the length and the position of the string 32, even if the clean air moves the reflector 36, the reflector 36 can be kept within a viewing field of the same camera 38. Therefore, the individual reflectors 36 can be identified from images of the camera 38. Further, one camera 38 may be used to image a plurality of the reflectors 36, for example.

Reference numerals 40 denote particle counters. For example, the particle counters 40 measure the number and sizes of particles flowing through upper and lower stages of the measuring unit 24. Reference numerals 42 denote distance sensors 42. The distance sensor 42 measures the distance to a support column or the like of the cell where the measuring unit 24 is placed, for detecting accuracy of a transfer position of the measuring unit 24. A reference numeral 44 denotes a vibration sensor. For example, the vibration sensor 44 is provided at the center in the lower stage of the measuring unit 24. The vibration sensor 44 may be provided in each of the stages.

For example, the vibration sensor 44 includes an acceleration sensor. Preferably, the vibration sensor 44 measures vibrations applied to the measuring unit 24 in each of x direction, y direction, and z direction. Reference numerals 46 denote static electricity sensors. The static electricity sensors 46 may not be provided. For example, the static electricity sensor 46 detects a charged condition of a glass substrate of a flat panel display as a stored article. The glass substrate is electrically charged when it contacts clean air containing ions, or friction with a glass support member of a cassette (not shown) occurs during transportation. When the glass substrate is electrically charged, the circuit and transistors or the like on the glass substrate may be damaged undesirably. By charging of the glass substrate, an electrical field is generated around the glass substrate. The electrical field is measured by the static electricity sensor 46. The vibration sensor 44 and the static electricity sensor 46 are not directly related to measurement of air flow. The particle counter 40 measures the degree of contamination of the air. In this respect, the particle counter 40 is related to measurement of the air flow of the clean air.

A reference numeral 48 denotes a power source unit used as a power source arranged to supply power to components such as the cameras 38, the particle counters 40, the vibration sensor 44, and the statistic electricity sensors 46, for example. For example, the power source unit 48 is charged by the charging station 19. A reference numeral 50 denotes a control unit arranged to process data from the cameras 38, the particle counters 40, the vibration sensor 44, and the static electricity sensors 46, and in particular, recognizes images from the camera 38 to determine distribution of the orientation and wind speed of the air flow. Further, the control unit 50 communicates with, e.g., a wireless LAN (not shown) provided in the automated warehouse. Otherwise, when the control unit 50 is placed on an elevation frame of a stacker crane, the control unit 50 communicates with the stacker crane. Alternatively, instead of the above, the control unit 50 may communicate with a communication interface provided in the charging station. During communication, a measurement result is outputted from the measuring unit 24, and an instruction regarding measurement is received from the opponent.

Figure 6:
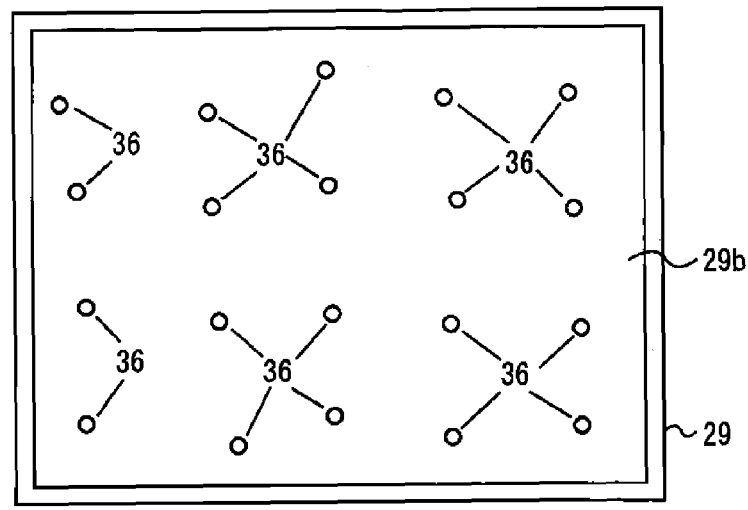
FIG. 6 is a view schematically showing distribution of reflectors as viewed in a vertical direction in a preferred embodiment of the present invention.

FIG. 6 schematically shows a state where the reflector 36 is viewed downwardly from an upper position, or upwardly from a lower position. Since the partition 29b of the casing 29 is opaque, the upper and lower reflectors 36 cannot be viewed at the same time. By the air flow, the reflectors 36 are displaced horizontally. Since the displacement is small, the reflectors 36 can be identified individually. The orientation of the displacement indicates the wind orientation in the horizontal plane, and the magnitude of displacement indicates the wind speed in the horizontal plane. At least one of the wind orientation and the wind speed is measured. In the case where the camera is attached at an upper position, the reflectors 36 are provided above the windsails 34.

The casing 29 preferably has the same size as the actual cassette containing the glass substrate. In the actual cassette, the air flows horizontally between the glass substrates. The air flow in the actual cassette is simulated by the air flow in the casing 29 partitioned into upper and lower portions. Since the air flows horizontally in the actual cassette, it is sufficient to detect the wind speed and the wind orientation in the horizontal plane.

Figure 7:
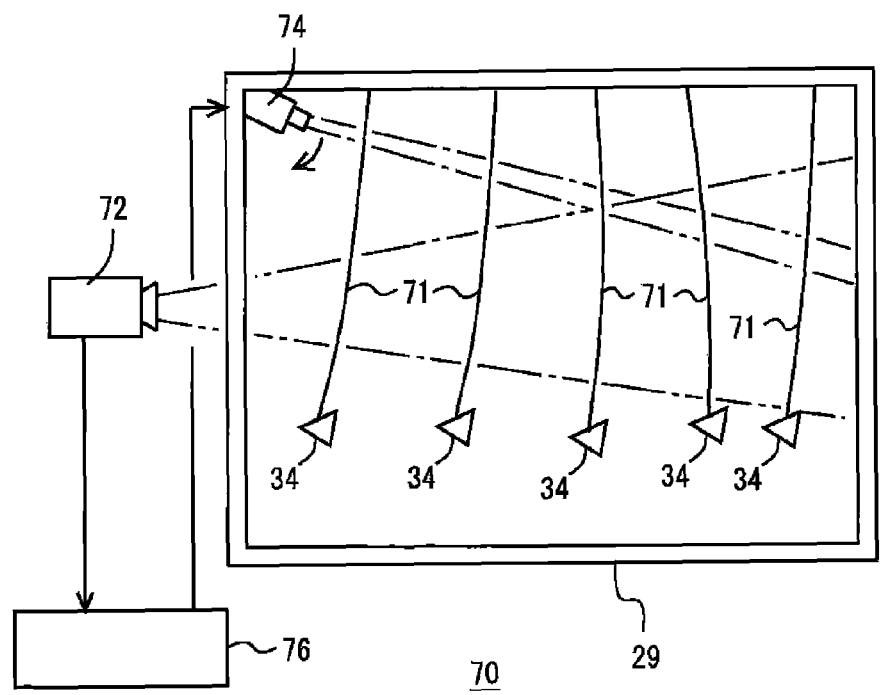
FIG. 7 is a view showing imaging of the reflectors in a preferred embodiment of the present invention.

FIG. 7 shows a measuring unit 70 arranged to measure the air flow in a preferred embodiment of the present invention. Windsails 34 are preferably attached to lower ends of reflective strings 71, and the strings 71 are imaged by a camera 72. Further, an image recognition unit 76 controls the slit light source 74 for allowing the camera 72 to image the strings 71 while changing the orientation of the slit light source 74. In this manner, the strings 71 can be identified respectively, and displacement of each string can be measured. However, the displacement of the strings in the lateral direction in FIG. 7 cannot be determined easily by image recognition based on the orientation of the slit light and positions of the strings indicated by luminance points imaged by the camera. Further, the slit light source 74 is not inexpensive. For accurate imaging, the camera 72 needs to be positioned remotely from the strings 71. Therefore, the measuring unit 70 has a large scale.

Preferred embodiments of the present invention provide the following advantages.

1) A single measuring unit 24 arranged to measure the air flow is used for measuring the state of air flow in each cell in the automated warehouse and, and on the elevation frame of the stacker crane. The measurement results can be fed back, e.g., to the fan filter unit 18 and the openings of the exhaust valves 26 to maintain the clean environment around stored articles.

2) In the case where the air flow is applied to the wind receive 34 to obtain significant displacement of the windsail 34, and a small reflector 36 is imaged, the wind orientation and the wind speed can be measured accurately.

3) By suspending a plurality of tracers 30, distribution of the wind orientation and wind speed in the horizontal plane can be measured.

4) By providing the partition 29b in the measuring unit, the state of the air flow can be measured separately in each of upper and lower portions. Further, the displacement of the reflector in the horizontal plan can be rectified in the same manner as in the case of the actual cassette.

5) In the case where the reflector 36 is imaged from an upper position or from a lower position by the camera 38, the displacement of the reflectors 36 in the horizontal plane can be easily imaged.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A measuring unit arranged to measure air flow comprising:
    a casing arranged to be transported by a transportation apparatus in an automated warehouse and to be placed in a cell of the automated warehouse;
    a plurality of strings suspended in the casing;
    a measuring device arranged to measure displacement of the strings caused by air flow in the casing; and
    a computation device arranged to determine a state of the air flow based on the measured displacement of the strings.

2. The measuring unit arranged to measure air flow according to claim 1, wherein the casing is divided into at least upper and lower layers, the strings and the measuring device being provided in each of the layers and arranged to allow the computation device to determine the state of the air flow in each of the layers.

3. The measuring unit arranged to measure air flow according to claim 1, the measuring device further comprising a camera arranged to image the strings from an upper position or from a lower position.

4. A method of measuring air flow in an automated warehouse, the method comprising the steps of:
    providing a measuring unit in the automated warehouse, the measuring unit having a plurality of strings in a casing arranged to be transported by a transportation apparatus in the automated warehouse and to be placed in a cell of the automated warehouse;
    measuring displacement of the strings caused by air flow in the casing; and
    determining a state of the air flow based on the measured displacement of the strings.

* * * * *